UNITED STATES PATENT OFFICE

PERCY C. C. ISHERWOOD, OF HARROW, ENGLAND.

TREATMENT OF REFRACTORY ZINC-LEAD ORES.

No. 925,190.　　　Specification of Letters Patent.　　Patented June 15, 1909.

Application filed July 8, 1907. Serial No. 382,817.

*To all whom it may concern:*

Be it known that I, PERCY CLAUDE CAMERON ISHERWOOD, Ph. D., chemist, a subject of the King of Great Britain and Ireland, residing at The Oaks, High Road, Wealdstone, Harrow, England, have invented certain new and useful Improvements Relating to the Treatment of Refactory Zinc-Lead Ores, of which the following is a specification.

This invention relates to the treatment of refractory zinc-lead ores and has for its object to extract the zinc and copper with or without the lead and a portion of the silver from refractory sulfid or other ores in a simple and effective way and in a usable or salable form while leaving the gold and the remainder of the whole of the silver and lead in the residues in a form convenient for extraction by ordinary known means. According to the invention such ores are treated with ammonium sulfate suitably prepared as hereafter described for the solution of the bulk of the zinc and copper and a trace of the lead and for the subsequent precipitation thereof under conditions that do not involve the use of any other reagent and which permits of the regeneration of the ammonium sulfate.

The invention comprises the treatment of the ores in the manner which is hereinafter described.

In carrying the invention into effect in the case, for example, of sulfid ores, I grind the ore to a suitable degree of fineness and roast it in a current of air. In the case of ordinary refractory zinc-lead sulfid ores as those from the Broken Hill or similar deposits, the ore is ground to a convenient degree of fineness, such for example, as to pass through a sieve of from 90 to 100 meshes to the linear inch, and the roasting is advantageously started at a very dull red heat, the ore being stirred the while to prevent caking. The heat is applied for two hours or more, the temperature being then increased and the heating continued until practically no free sulfid remains. Zinc, lead, iron, copper and other oxidizable sulfids which may be present are thus converted, some wholly into oxids, some partly into sulfate and oxid and possibly some wholly into sulfate if the temperature happen to be exactly suitable. The roasted ore may be then leached with water, whereby any zinc sulfate or other soluble sulfates or compounds are dissolved out. The residues from the leaching or as the case may be the original roasted ore, are treated in a hot concentrated solution of ammonium sulfate. The solution removed from the undissolved portion of the ore then contains a large proportion of the zinc and copper and a trace of the lead. On cooling the solution and, if desired, diluting with water the bulk of the zinc and traces of the lead are precipitated as double salts while the copper together with any excess of ammonium sulfate remains in solution. The bulk of the zinc and copper together with traces of the lead is dissolved out of the ore each as a double salt in combination with ammonium sulfate. During the process, some free ammonia is evolved and (zinc sulfate) consequently produced. The ammonia may be separated and recovered by a method similar to that hereinafter described. The evolution of ammonia may be reduced by conducting the extraction with the ammonium sulfate under pressure.

The zinc is extracted from the precipitate and the ammonia combined therewith is recovered as ammonium sulfate. The copper may be removed from the solution by any suitable means and the mother liquor which consists of an aqueous solution of the excess of ammonium sulfate, and a proportion of the double salt or salts referred to together with some zinc sulfate, may be used for the treatment of a further quantity of ore either after or without concentration.

The solution of zinc sulfate obtained by the leaching of the roasted ore with water prior to the treatment with ammonium sulfate may be treated by any suitable means for the extraction of the zinc either as metal or as oxid or in any other form suitable for sale as spelter, pigment, etc.

In order to regenerate the ammonia from the precipitated double salt or salts, any suitable known process may be employed. In the process which I prefer, however, the salts are mixed with slightly more than the theoretical amount of lime, preferably in the form of milk of lime, and distilled with the aid of steam. The ammonia, together with the associated water vapor, is either absorbed in sulfuric acid or is condensed and subsequently neutralized with sulfuric acid. For the regeneration of the ammonium sulfate solution thus produced a solution of calcium chlorid is added. Calcium sulfate is thereby precipitated and ammonium chlorid is produced as a solution. This solution after separation from the calcium sulfate and if necessary after concentration, is ready for treating a further quantity of ore. The solid residues contain the zinc which was dissolved from the ore by the ammonium sulfate together with calcium sulfate while the solution obtained by neutralizing the ammoniacal distillate with sulfuric acid would be used for the extraction of successive quantities of ore, the calcium chlorid treatment being omitted. The solid residues aforesaid are treated by any suitable means for the recovery of the zinc in a salable form as metal or otherwise.

In the case of oxidized ores such as, for instance those containing calamin (zinc carbonate) anglesite (lead sulfate) etc., the invention is carried out in exactly the same way, except that only sufficient roasting is required to convert carbonates into oxids.

It will be understood that the degree of extraction of the zinc depends largely on the care with which the roasting is carried out.

After prolonged heating at not too high a temperature, the process usually removes the bulk of the zinc, but when sufficient zinc remains in the residues to make its removal desirable it may be extracted by heating the dried residue with a solid ammonium sulfate at a temperature below redness, whereby the zinc and a proportion of the iron are converted into their respective sulfates with the simultaneous emission of ammonia gas.

The ammonia gas may be recovered by any of the usual processes and the sulfate of zinc and iron dissolved out and recovered by any suitable means.

I am aware that it has been proposed to treat the roasted ores with ammonium sulfate or ammonium sulfamate in closed vessels heated to from 300° to 500° C. for dissolving the zinc or copper as sulfates with the evolution of ammonia, which sulfates are afterward treated with the ammonia gas evolved, but this process is open to the objection that the precipitation of the zinc hydrate by the use of ammonia is very incomplete owing to the solubility of zinc hydrate in the ammonium sulfate simultaneously formed, and to the objection that the gelatinous character of the zinc hydrate renders its treatment and purification a matter of extreme difficulty, whereas according to my process zinc sulfate is not produced and the temperature is not sufficiently high to render necessary the use of a closed vessel the temperature being always at or under the boiling point of the solution while moreover it is the essential purpose of my invention to produce and isolate a double compound of zinc oxid and ammonium sulfate and not zinc sulfate.

What I claim as my invention and desire to secure by Letters Patent is:—

1. A process for extracting zinc and copper from refractory zinc lead ores consisting in washing the ore and then treating it in a concentrated solution of ammonium sulfate.

2. A process for extracting zinc and copper from refractory zinc lead ores consisting in roasting the ore, leaching it and then treating the residue in a concentrated solution of ammonium sulfate.

3. A process for extracting zinc and copper from refractory zinc lead ores consisting in washing the ore and then treating it in a hot concentrated solution of ammonium sulfate.

4. A process for extracting zinc and copper from refractory zinc lead ores consisting in roasting the ore, leaching it and then treating the residue in a hot concentrated solution of ammonium sulfate.

5. A process for extracting zinc and copper from refractory zinc lead ores consisting in washing the ore, treating it in a concentrated solution of ammonium sulfate and then heating the residues with solid ammonium sulfate at a temperature below redness.

6. A process for extracting zinc and copper from refractory zinc lead ores consisting in roasting the ore, leaching it, treating the residues in a concentrated solution of ammonium sulfate, and then heating the residues with solid ammonium sulfate at a temperature below redness.

7. A process for extracting zinc and copper from refractory zinc lead ores consisting in washing the ore, treating it in a hot concentrated solution of ammonium sulfate and then heating the residues with solid ammonium sulfate at a temperature below redness.

8. A process for extracting zinc and copper from refractory zinc lead ores consisting in roasting the ore, leaching it, treating the residues in a hot concentrated solution of ammonium sulfate, and then heating the residues with solid ammonium sulfate at a temperature below redness.

In testimony whereof I have hereunto signed my name to this specification in the presence of two subscribing witnesses.

PERCY C. C. ISHERWOOD.

Witnesses:
FREDERICK COLLINS,
RICHARD WILLIAM DAVIES.